(12) United States Patent
Takahashi

(10) Patent No.: US 8,281,367 B2
(45) Date of Patent: Oct. 2, 2012

(54) QUARANTINE SYSTEM AND METHOD

(75) Inventor: Kiyoshi Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 922 days.

(21) Appl. No.: 11/848,413

(22) Filed: Aug. 31, 2007

(65) Prior Publication Data

US 2008/0244703 A1 Oct. 2, 2008

(30) Foreign Application Priority Data

Sep. 29, 2006 (JP) ................................ 2006-266552

(51) Int. Cl.
*G06F 7/04* (2006.01)
(52) U.S. Cl. .......................................... 726/3; 709/221
(58) Field of Classification Search ....... 726/3; 709/221
See application file for complete search history.

(56) References Cited

U.S. PATENT DOCUMENTS

| 2006/0070129 | A1* | 3/2006 | Sobel et al. | ..................... | 726/23 |
| 2006/0085850 | A1* | 4/2006 | Mayfield et al. | ................ | 726/14 |
| 2007/0245138 | A1* | 10/2007 | Camenisch | .................... | 713/156 |
| 2008/0040785 | A1* | 2/2008 | Shimada | ......................... | 726/10 |

FOREIGN PATENT DOCUMENTS

| JP | 2002-366525 | 12/2002 |
| JP | 2005-216253 | 8/2005 |
| JP | 2005-346183 | 12/2005 |
| JP | 2006-178762 | 7/2006 |
| JP | 2006-185210 | 7/2006 |

OTHER PUBLICATIONS

Toshio (Machine Translation of JP2002-366525).*
Shinichi (2006). Machine Translation of JP 2006185210.*
Shinichi05 (Translation of JP 2005-346183.*

* cited by examiner

*Primary Examiner* — Ashok Patel
*Assistant Examiner* — Brian Shaw
(74) *Attorney, Agent, or Firm* — Antonelli, Terry, Stout & Kraus, LLP.

(57) ABSTRACT

A quarantine system QS includes a network connection control apparatus 103 for connecting a client computer 104 to a network; a management server (a security inspection computer 101 and a property information managed computer 102) for managing property information of the client computer connected to the network, and issuing an inspection certificate to the client computer when the property information satisfies a predetermined condition; and a network connection control computer 100, when the computer makes a connection request to the network, for checking an inspection certificate sent by the client computer and the inspection certificate issued by the management server, instructing the apparatus 103 to connect the client computer to the service network 10s when the check result matches, and instructing the apparatus 103 to connect the client computer to the quarantine network 10q for quarantining the property information of the client computer when the check result does not match.

15 Claims, 16 Drawing Sheets

FIG. 13

```
                                    1300
<Header>
Inspection Certificate ID : 001
Issue Date and Time : 2006/07/18
Expiration Date and Time : 2006/10/18
Inspection Policy ID : 001
Property ID : 0001
MAC Address : AA:BB:CC:DD:EE:FF
<Check Item>
ItemA(Mandatory Software) : No Update
ItemB(Prohibited Software) : No Update
ItemC(Antivirus product) : No Update
ItemD(Patch Information ) : No Update
<Check Filter Condition>
ItemA : Valid
ItemB : Valid
ItemC : Invalid
ItemD : Valid
<Update Filter Condition>
ItemA : SoftA/1.1,SoftB/2.2,SoftC/3.3
ItemB : SoftX,SoftY,SoftZ
ItemC : AvSoft1/1.1/20050707/1.1.1,AvSoft2/2.2/20050707/2.2.2
ItemD : PatchA,PatchB,PatchC
```

FIG. 17

```
                    1700
Connection Time : 10:00~17:00, ON/OFF
Connection Interval : 24h, ON/OFF
```

| 1801 | 1802 | 1803 | 1804 | 1805 |
|------|------|------|------|------|
| 001 | 00:11:22:33:44:55 | 2006/07/11 08:00 | 2h | Quarantine Network |
| 002 | 66:77:88:99:aa:bb | 2006/07/12 08:00 | 1h | Quarantine Network |
| 003 | aa:bb:cc:dd:ee:ff | 2006/07/12 08:00 | 3h | Service Network |

| 1901 | 1902 | 1903 | 1904 | 1905 |
|------|------|------|------|------|
| 00:11:22:33:44:55 | 0001 | Permission | Service Network | None |
| 66:77:88:99:aa:bb | 0002 | Rejection | Service Network | Quarantine Network |
| aa:bb:cc:dd:ee:ff | 0003 | Permission | Service Network | Quarantine Network |

| 2001 | 2002 |
|---|---|
| suzuki | ********* |
| satoh | ********* |
| tanaka | ********* |

| 2101 | 2102 | 2103 |
|---|---|---|
| 0001 | 00:11:22:33:44:55 | 192.168.1.1 |
| 0002 | 66:77:88:99:aa:bb | 192.168.1.2 |
| 0003 | aa:bb:cc:dd:ee:ff | 192.168.1.3 |

| 2201 | 2202 | 2203 | 2204 |
|---|---|---|---|
| 001 | SoftA | 1.1.1 | 0001 |
| 002 | SoftB | 2.2.2 | 0001 |
| 003 | SoftC | 3.3.3 | 0002 |

| 2301 | 2302 | 2303 | 2304 | 2305 | 2306 | 2307 |
|---|---|---|---|---|---|---|
| 001 | AV1 | 1.1.1 | 2006/07/11 | 11.11.11 | Resident | 0001 |
| 002 | AV2 | 2.2.2 | 2006/07/12 | 22.22.22 | Resident | 0002 |
| 003 | AV3 | 3.3.3 | 2006/07/12 | 33.33.33 | No Resident | 0003 |

| 2401 | 2402 | 2403 |
|---|---|---|
| 001 | Patch A | 0001 |
| 002 | Patch B | 0002 |
| 003 | Patch C | 0003 |

| 2501 | 2502 | 2503 | 2504 |
|---|---|---|---|
| 001 | OS | ····OS | 0001 |
| 002 | Memory Capacity | 2GB | 0001 |
| 003 | Hard Disk Capacity | 240GB | 0001 |
| 004 | Password Setting Registry | ON | 0001 |
| 005 | Memory Capacity | 1GB | 0002 |
| 006 | Hard Disk Capacity | 120GB | 0003 |
| 007 | Password Setting Registry | ON | 0003 |

QUARANTINE SYSTEM AND METHOD

INCORPORATION BY REFERENCE

This application relates to and claims priority from Japanese Patent Application No. 2006-266552 filed on Sep. 29, 2006, the entire disclosure of which is incorporated herein by reference.

BACKGROUND OF THE INVENTION

1. Field of the Invention

The present invention relates to a quarantine system, method, and program, which may inspect a status of a security measure in a client computer and control a connection of the client to a network, in connecting the client computer to the network.

2. Description of the Related Art

In a conventional quarantine system, when a client computer (connection terminal) requests its connection to a network, property information is collected in a connection object terminal by a client's management server for controlling the client computer; and when it is authenticated that a property in the connection object terminal satisfies a definite condition of the network connection based on the property information, the connection object terminal and the network are controlled to be connected (Japanese Patent Laid-Open Publication No. 2005-346183).

SUMMARY OF THE INVENTION

In the quarantine system of the JP 2005-346183, because connection to the network is established after the property information is collected and inspected, there is a problem that it takes much time when a client computer is connected. For example, it takes a few minutes in some cases, depending on the scale of the network and the number of connection terminals of the client computer.

Furthermore, also when a client computer is connected of which property information has not been changed, the computer is connected after the property information is collected and inspected in the network connection. Therefore, in a case of a connection terminal where log-on and log-off are frequently made, there is a problem that a delay time occurs for every connection.

Moreover, because the property information is collected and inspected only when the terminal establishes the connection to the network, it is not possible to detect and inspect the change of the property information after the connection. Furthermore, because property information collected every time is inspected, a load comes into concentrating on a computer by which the inspection is executed. Thus, there is a problem that it is difficult to apply the quarantine system of the JP 2005-346183 to a client computer environment having a lot of client computers.

The present invention solves the problems and provides a quarantine system, method, and program that may inspect a status of a security measure in a client computer and control its connection to a network.

A quarantine system QS of the invention comprises: a network connection apparatus (for example, a network connection control apparatus 103) configured to connect a client (client computer 104) to a network; a management server (for example, a security inspection computer 101 and a property information managed computer 102) configured to manage property information of the client computer connected to the network, and to issue an inspection certificate to the client when the property information satisfies a predetermined condition; and an inspection certificate check server (for example, a network connection control computer 100), when the client computer makes a connection request to the network, configured to check an inspection certificate sent by the client computer and an inspection certificate issued by the management server, to instruct the network connection apparatus to connect the client computer to a first network (service network 10s) when the check result matches, and to instruct the network connection apparatus to connect the client computer to a second network (quarantine network 10q) configured to quarantine the property information of the client when the check result does not match.

According to the invention, it is possible to inspect a status of a security measure in a client (client computer) and to control a connection of the client to a network.

BRIEF DESCRIPTION OF THE DRAWINGS

FIG. 13 is an illustration drawing showing inspection certificate information.

FIG. 17 is an illustration drawing showing inspection certificate check filter information.

FIG. 18 is an illustration drawing showing a connection history table.

FIG. 19 is an illustration drawing showing a connection control table.

FIG. 20 is an illustration drawing showing a user authentication table.

FIG. 21 is an illustration drawing showing a property information table.

FIG. 22 is an illustration drawing showing a software table.

FIG. 23 is an illustration drawing showing an antivirus product table.

FIG. 24 is an illustration drawing showing a patch information table.

FIG. 25 is an illustration drawing showing a system information table.

BEST MODE FOR CARRYING OUT THE INVENTION

Here will be described an embodiment with reference to drawings.

Figure 1:
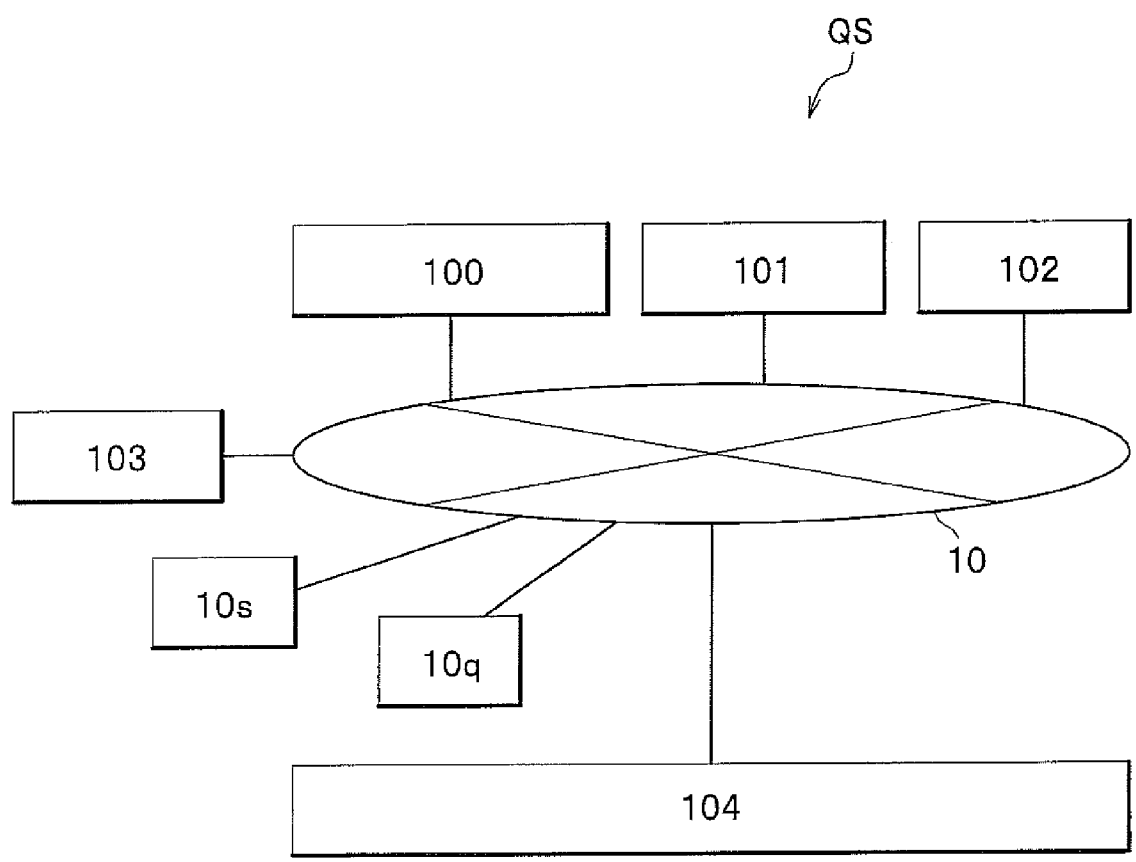
FIG. 1 is a block diagram showing one example of configurations of a computer system of a quarantine system.

As shown in FIG. 1, a quarantine system QS comprises a network connection control computer 100, a security inspection computer 101, a property information managed computer 102, a network connection control apparatus 103, and a client computer 104; and is connected to a network 10 such as a LAN (Local Area Network) and a WAN (Wide Area Network); and thereby each of the computers may mutually communicate. In FIG. 1, although each of the computers is indicated as one, the embodiment is not limited thereto.

The client computer 104 is connected to the network 10 via the network connection control apparatus 103 in the network connection. The network 10 has a service network 10s (first network) and a quarantine network 10q (second network). In a construction of each of the networks, several methods such as "providing a cable and physically separating the network" or "using a mechanism having a switch" may be thought of. The construction method of the network will be described later in a detailed configuration of the network connection control apparatus 103. The apparatus 103 inquires the network connection control computer 100 in response to a connection request received from the client computer 104 and controls the network connection of the computer 104 according to an instruction from the network connection control computer 100. The computer 100 determines the network connection control of the client computer 104 according to an instruction from the security inspection computer 101. The computer 101 inspects property information of the client computer 104 controlled by the property information managed computer 102 and instructs the network connection control computer 100 to control the network connection based on the result of the inspection. The property information managed computer 102 may collect and manage the property information of the client computer 104 connected to the network 10.

Here, "property information" is information representing properties of the client computer 104 including: a software name and version of software; a product name, version, pattern, search engine, and resident status of an antivirus product; a patch name of patch information; an OS (Operation System) name and OS version of system information; registry information; hardware information; and the like.

Figure 2:
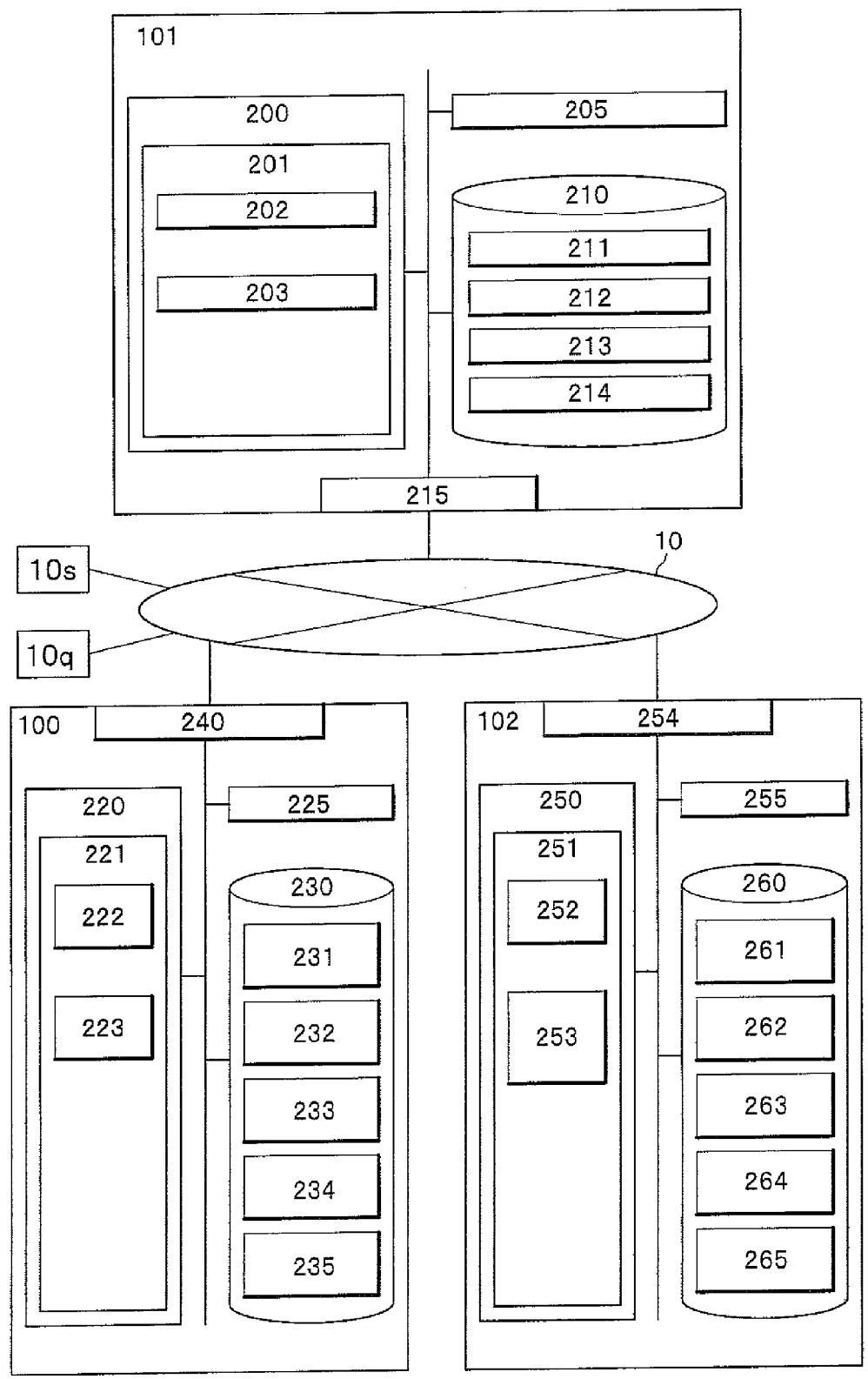
FIG. 2 is a block diagram showing one example of configurations of a network connection control computer, security inspection computer, and property information managed computer of the quarantine system.

The network connection control computer 100, as shown in FIG. 2, comprises a processor 225, a memory 220, and a storage unit 230, and is connected to the network 10 such as the LAN and the WAN via a communication interface 240. In the memory 220 are saved various programs, temporary data, and the like; specifically a program 221 is stored including those of an inspection certificate processing unit 222, a connection control processing unit 223, and the like. The processor 225 executes the various programs stored in the memory 220, and thereby executes respective processings of the inspection certificate processing unit 222, the connection control processing unit 223, and the like. The inspection certificate processing unit 222 checks an inspection certificate received according to a connection request from the client computer 104 and an inspection certificate kept by the network connection control computer 100. According to the check result, the connection control processing unit 223 instructs the network connection control apparatus 103 to execute a network connection control. Although the respective processings of the inspection certificate processing unit 222, the connection control processing unit 223, and the like are achieved by the processor 225 executing the program 221, the processings may also be achieved by hardware where the content of the program 221 is made into an integrated circuit.

Furthermore, the storage unit 230 comprises a hard disk drive (HDD) and the like, and saves various data with which a processing is executed. Specifically, the storage unit 230 stores an inspection certificate table 231, a connection history table 232, a connection control table 233, a user authentication table 234, and an inspection certificate check filter information 235. In addition, descriptions of the inspection certificate table 231, the connection history table 232, the connection control table 233, the user authentication table 234, and the inspection certificate check filter information 235 will be described later with reference to FIGS. 14, 18, 19, 20, and 17.

The security inspection computer 101 comprises a processor 205, a memory 200, and a storage unit 210, and is connected to the network 10 such as the LAN and the WAN through a communication interface 215. In the memory 200 are saved various programs, temporary data, and the like; specifically a program 201 is stored which includes an inspection certificate processing unit 202, a security inspection processing unit 203, and the like. The processor 205 executes the various programs stored in the memory 200, and thereby executes respective processings of the inspection certificate processing unit 202, the security inspection processing unit 203, and the like. The security inspection processing unit 203 executes a security inspection of property information according to a request from a property information managed computer 102. The inspection certificate processing unit 202 makes and issues an inspection certificate based on the result of the security inspection. In addition, although respective processings of the inspection certificate processing unit 202, the security inspection processing unit 203, and the like are achieved by the processor 205 for executing the program 201, the processings may also be achieved by hardware where the content of the program 221 is made an integrated circuit.

Furthermore, in the storage unit 210 are stored an inspection policy information 211, an inspection history table 212, an inspection certificate table 213, and an inspection certificate making filter information 214. In addition, the inspection policy information 211, the inspection history table 212, the inspection certificate table 213, and the inspection certificate making filter information 214 will be described later with reference to FIGS. 12, 16, 14, and 15.

The property information managed computer 102 comprises a processor 255, a memory 250, and a storage unit 260, and is connected to the network 10 such as the LAN and the WAN through a communication interface 254. In the memory 250 are saved various programs, temporary data, and the like; specifically, an inspection certificate processing unit 252, a property information collection processing unit 253, and the like are stored in the memory 250. The processor 255 executes the various programs stored in the memory 250, and thereby executes respective processings of the inspection certificate processing unit 252, the property information collection processing unit 253, and the like. The inspection certificate processing unit 252 receives an inspection result from the security inspection computer 101 and transmits the inspection certificate to the client computer 104. The property information collection processing unit 253 collects and manages the property information from the client computer 104, and requests the security inspection computer 101 to perform an inspection. In addition, although respective processings of inspection certificate processing unit 252, the property information collection processing unit 253, and the like may be achieved by the processor 255 for executing the program 251, the processings may also be achieved by hardware where the content of the program 251 is made an integrated circuit.

Furthermore, in the storage unit 260 are stored a property information table 261, a software table 262, a patch information table 264, and a system information table 265. In addition, descriptions of the respective tables will be given later with reference to FIGS. 21 to 25.

Figure 3:
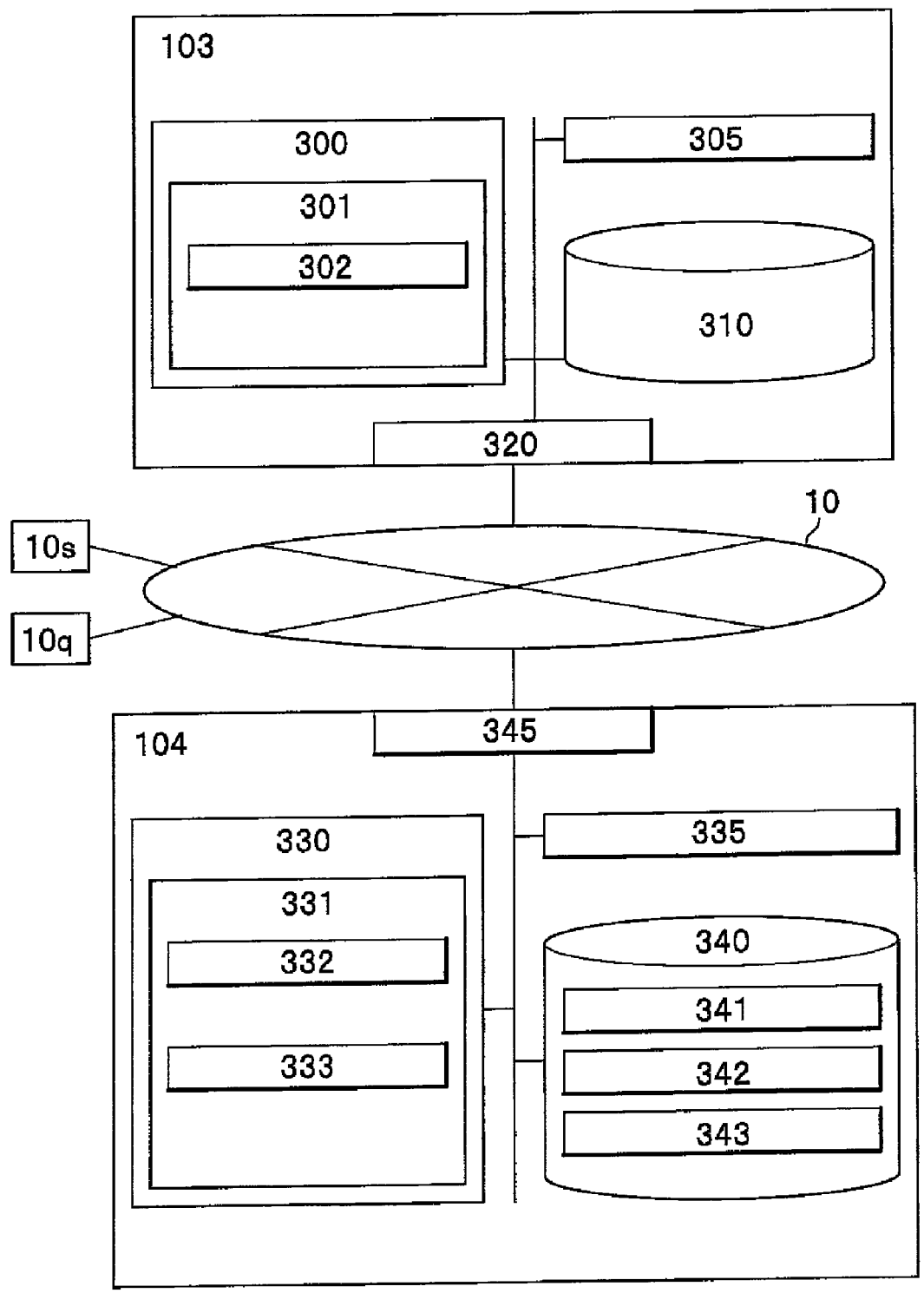
FIG. 3 is a block diagram showing one example of configurations of a network connection control apparatus and client computer of the quarantine system.

As shown in FIG. 3, the network connection control apparatus 103 comprises a processor 305, a memory 300, and a storage unit 310, and is connected to the network 10 such as the LAN and the WAN via a communication interface 320. In the memory 300 are saved various programs, temporary data, and the like; specifically a program 301 is stored which includes a connection control processing unit 302 and the like. The processor 305 executes the various programs stored in the memory 300, and thereby executes respective processings of the connection control processing unit 302 and the like. If the connection control processing unit 302 receives a connection request from the client computer 104, the unit 302 requests its connection to the network connection control computer 100, and executes the network connection of the computer 104, based on the connection control instruction of the computer 100.

Here, as a way for achieving the network connection control apparatus 103, there are some ways: a router, a firewall, a DHCP (Dynamic Host Configuration Protocol) server, a switch, and the like. When the way for achieving the network connection control apparatus 103 is any of the router and the firewall, the network connection control computer 100 designates any of such the IP address, filter, and access control list of the client computer 104 as a connection control instruction. The network connection control apparatus 103 receives the connection control instruction, executes an access control, and achieves the quarantine network 10q or provides the service network 10s as it is without executing the access control.

In the case of the DHCP sever, the network connection control computer 100 designates to distribute the IP address of the quarantine network 10q configured to restrict an access as a connection control instruction or to distribute the IP address of the service network 10s. The network connection control apparatus 103 receives the connection control instruction and distributes either the IP address of the quarantine network 10q or that of the service network 10s to the client computer 104.

In the case of the switch, the network connection control computer 100 designates as a connection control instruction any one of a service VLAN (Virtual Local Area Network) and a quarantine VLAN where the client computer 104 belongs. The network connection control apparatus 103 receives the connection control instruction, makes the computer 104 belong to the designated VLAN, and thereby establishes the connection of the computer 104 to any one of the service network 10s and the quarantine network 10q. Although the respective processings of the connection control processing unit 302 and the like are achieved by the processor 305 for executing the program 301, the processings may also be achieved by hardware where the content of the program 301 is made an integrated circuit.

In addition, the quarantine network 10q is a network configured to quarantine a virus infection and the like to a computer, and comprises a quarantine server (not shown), a pattern update server (not shown), and the like. It is preferable that the client computer 104 is basically connected to the quarantine network 10q and may not be connected to the service network 10s before a time when checking an inspection certificate is completed in the network connection control computer 100.

The client computer 104 comprises a processor 335, a memory 330, and a storage unit 340, and is connected to the network 10 such as the LAN and the WAN via a communication interface 345. In the memory 330 are saved various programs, temporary data, and the like; specifically a program 331 is stored which includes an inspection certificate processing unit 332, a property information monitoring processing unit 333, and the like. The processor 335 executes the various programs stored in the memory 330, and thereby executes respective processings of the inspection certificate processing unit 332, the property information monitoring processing unit 333, and the like.

The property information monitoring processing unit 333 detects the update of property information according to an installation of software in the client computer 104, and transmits the updated property information to the property information managed computer 102. When the property information is updated, the inspection certificate processing unit 332 updates the inspection certificate in order to indicate that the property information is updated, and transmits the inspection certificate to the network connection control computer 100 in the network connection of the client computer 104. In addition, although the respective processings of the inspection certificate processing unit 332, the property information monitoring processing unit 333, and the like are achieved by the processor 335 for executing the program 331, the processings may also be achieved by hardware where the content of the program 331 is made an integrated circuit.

Furthermore, in the storage unit 340 are stored a property information 341, an inspection certificate information 342, and an inspection certificate update filter information 343. Descriptions of the inspection certificate information 342 and the inspection certificate update filter information 343 will be given later with reference to FIGS. 13 and 11.

Here will be described a mutual communication flow, referring to FIG. 4.

Figure 4:
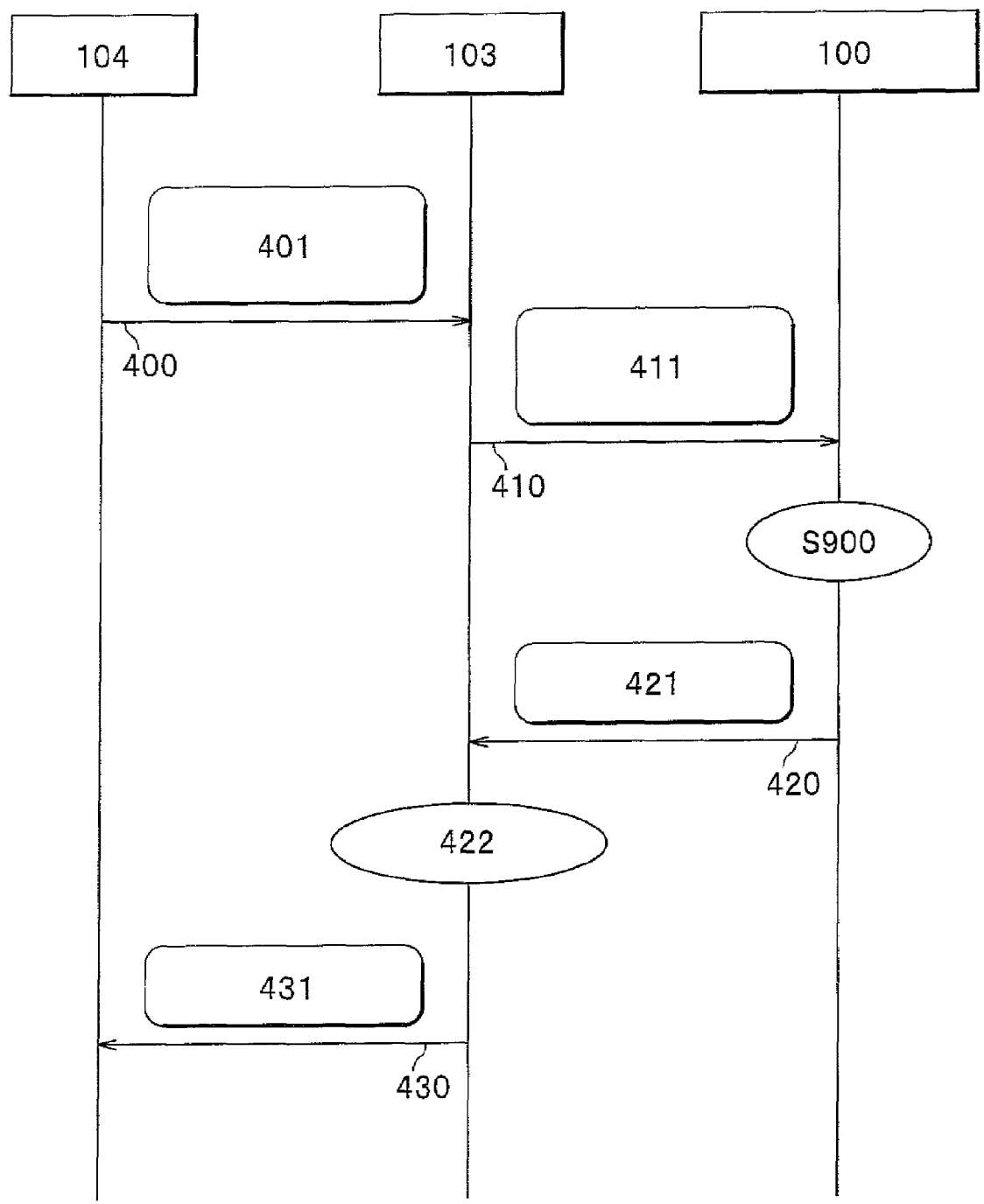
FIG. 4 is an illustration drawing showing one example of mutual communication relationships between the property information managed computer, the network connection control apparatus, and the network connection computer when the client computer is connected to the network.

As shown in FIG. 4, when the client computer 104 is connected to the network 10, the computer 4 makes a connection request 400 to the network connection control apparatus 103. In the step of making the connection request 400 is transmitted information 401 including user information, a MAC (Media Access Control) address, and an inspection certificate. If the network connection control apparatus 103 receives the connection request 400 from the client computer 104, the network connection control apparatus 103 makes a connection request 410. In the step of making the connection request 410 is transmitted information 411 including the received user information, the MAC address, and the inspection certificate.

If the network connection control computer 100 receives the connection request 410, the computer 100 executes processings such as a user authentication, a MAC authentication, and an inspection certificate check according to a processing S900. After the network connection control computer 100 executes the processing S900, the computer 100 gives a connection control instruction 420 based on connection destination information of the service network 10s and the quarantine network 10q to the network connection control apparatus 103 which the information is the output result of the processing S900. In the step of giving the connection control instruction 420 is transmitted information 421 including the connection destination information for the client computer 104 and a notice message indicating the connection destination.

If the network connection control apparatus 103 receives the connection control instruction 420, the apparatus 103 executes a network connection control 422, and then makes a connection response 430 to the client computer 104. In the step of making the connection response 430 is transmitted the received notice message 431. According to the above described mutual communication, the network connection of the client computer 104 is controlled.

Figure 5:
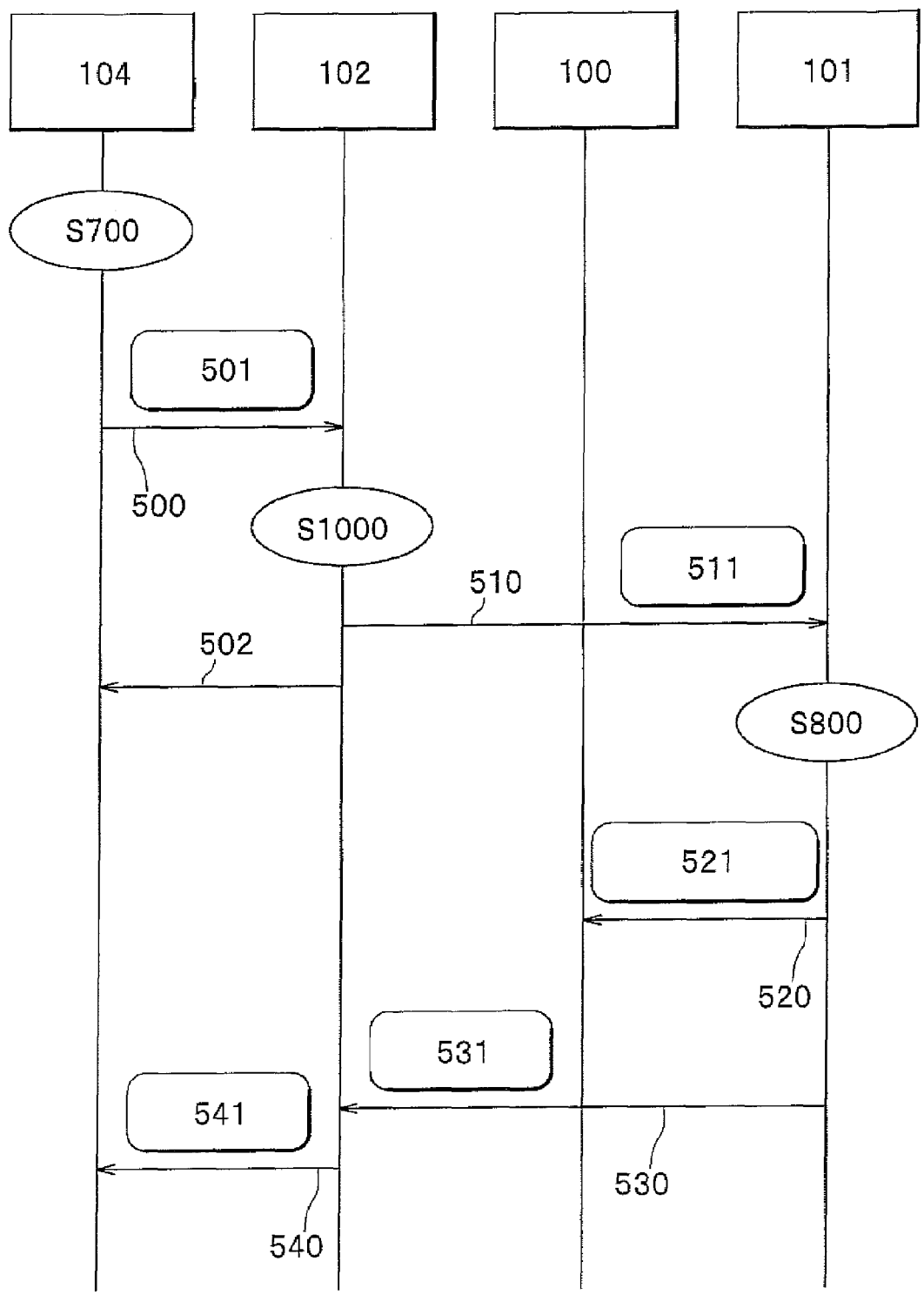
FIG. 5 is an illustration drawing showing one example of mutual communication relationships between the network connection control apparatus and the network connection computer when the client computer is connected to the network.

Here will be described a mutual communication flow, referring to FIG. 5.

If the client computer 104 detects the update of property information according to an installation of software through the property information monitoring processing unit 333 (processing S700), the computer 104 gives an update notice 500 to the property information managed computer 102, based on the updated property information that is the output result of the processing S700. In the step of giving the update notice 500 is transmitted information 501 including the updated property information.

If the property information managed computer 102 receives the update notice 500, the computer 102 collects the property information from the client computer 104 through a property information collection processing unit 253 (processing S1000), the computer 102 makes the inspection request 510 to the security inspection computer 101. In the step of making the inspection request 510 is transmitted updated property information 511 including the updated property information of the client computer 104. Furthermore, after the property information managed computer 102 stores the property information from the client computer 104, the computer 102 transmits a property information collection response 502 to the computer 104.

If the security inspection computer 101 receives the inspection request 510, the computer 101 executes the security inspection of the property information responsive to the request from the property information managed computer 102 through the security information processing unit 203 (processing S800). Then the security inspection computer 101 obtains an inspection certificate and any connection control such as a connection permission or a connection rejection to the service network 10s, and a quarantine; and gives a connection control instruction 520 to the network connection control computer 100 as output of processings such as a security inspection and an inspection certificate making. In the step of giving the connection control instruction 520 is transmitted information 521 including connection control instructions such as the inspection certificate, and the connection permission, the connection rejection, or the quarantine.

Furthermore, after the security inspection computer 101 executes the connection control instruction 520, the computer 101 executes an inspection response 530 to the property information managed computer 102. In the step of making the inspection response 530 is transmitted information 531 including the inspection certificate.

If the property information managed computer 102 receives the inspection response 530, the computer 102 gives an updated result notice 540 to the client computer 104. In the step of giving the updated result notice 540 is transmitted information 541 including the inspection certificate. According to such the mutual communication, when the property information is updated in the client computer 104, the property information managed computer 102 collects the property information of the computer 104, the security inspection computer 101 executes the security inspection, and instructs the network connection control computer 100 to execute the network connection control.

Figure 6:
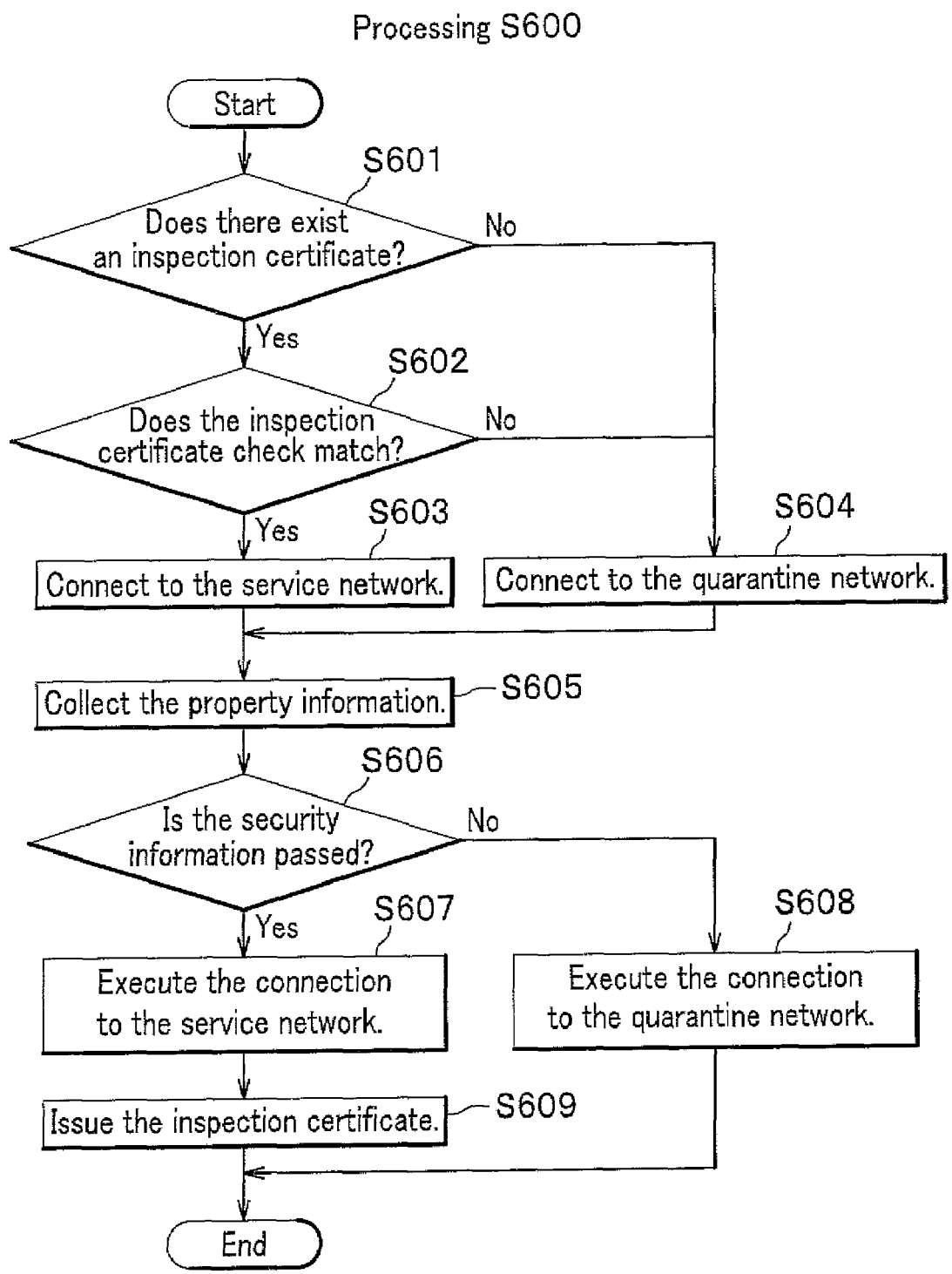
FIG. 6 is a flowchart showing one example of overall processing flows executed by each computer of the quarantine system.

Here will be described a flow of the processing S600, referring to FIG. 6.

If the client computer 104 is connected to the network 10, the processing is started. If the network connection control computer 100 is requested for a network connection, the computer 100 determines whether or not there exists an inspection certificate in the connection request (processing S601). As a result of the determination, when there exists the inspection certificate (Yes in the processing S601), the network connection control computer 100 checks the inspection certificate obtained according to the connection request and an inspection certificate kept by the computer 100 (processing S602). As a result of the determination, when there exists no inspection certificate (No in the processing S601), the network connection control computer 100 gives a connection control instruction to the network connection control apparatus 103 to connect the client computer 104 to the quarantine network 10q, and the apparatus 103 connects the computer 104 to the quarantine network 10q (processing S604). Then the processing S600 proceeds to the processing S605.

As a result of the network connection control computer 100 checking the inspection certificate, when the inspection certificate check matches (Yes in the processing S602), the computer 100 gives the connection control instruction to the network connection control apparatus 103 to connect the client computer 104 to the service network 10s, and the apparatus 103 connects the computer 104 to the service network 10s (processing S603). Then the processing S600 proceeds to the processing S605. When the inspection certificate check fails to match (No in the processing S602), the processing S600 proceeds to the processing S604. Then the processing S600 proceeds to the processing S605.

After the client computer 104 is connected any one of the quarantine network 10q and the service network 10s, the computer 104 notices the property information managed computer 102 of the property information. The computer 102 collects the property information of the client computer 104 and makes an inspection request to the security inspection computer 101 (processing S605).

The security inspection computer 101 inspects whether or not an antivirus product and the like are contained in the collected property information (processing S606). As a result of the inspection, when the inspection is passed (Yes in the processing S606), the security inspection computer 101 executes the connection instruction of the connection permission for the network connection control computer 100 to connect the client computer 104 to the service network 10s (processing S607). As a result of the inspection, when the inspection is not passed (No in the processing S606), the security inspection computer 101 executes the connection instruction of the connection rejection for the network connection control computer 100 to connect the client computer 104 to the quarantine network 10q (processing S608). When the security inspection computer 101 gives the connection instruction of the connection permission (processing S607), the computer 101 issues the inspection certificate (processing S609). If any one of the inspection certificate issue (processing S609) and the connection instruction of the connection rejection (processing S608) for connecting the client computer 104 to the quarantine network 10q is executed (processing S608), a series of the processing S600 is completed.

Figure 7:
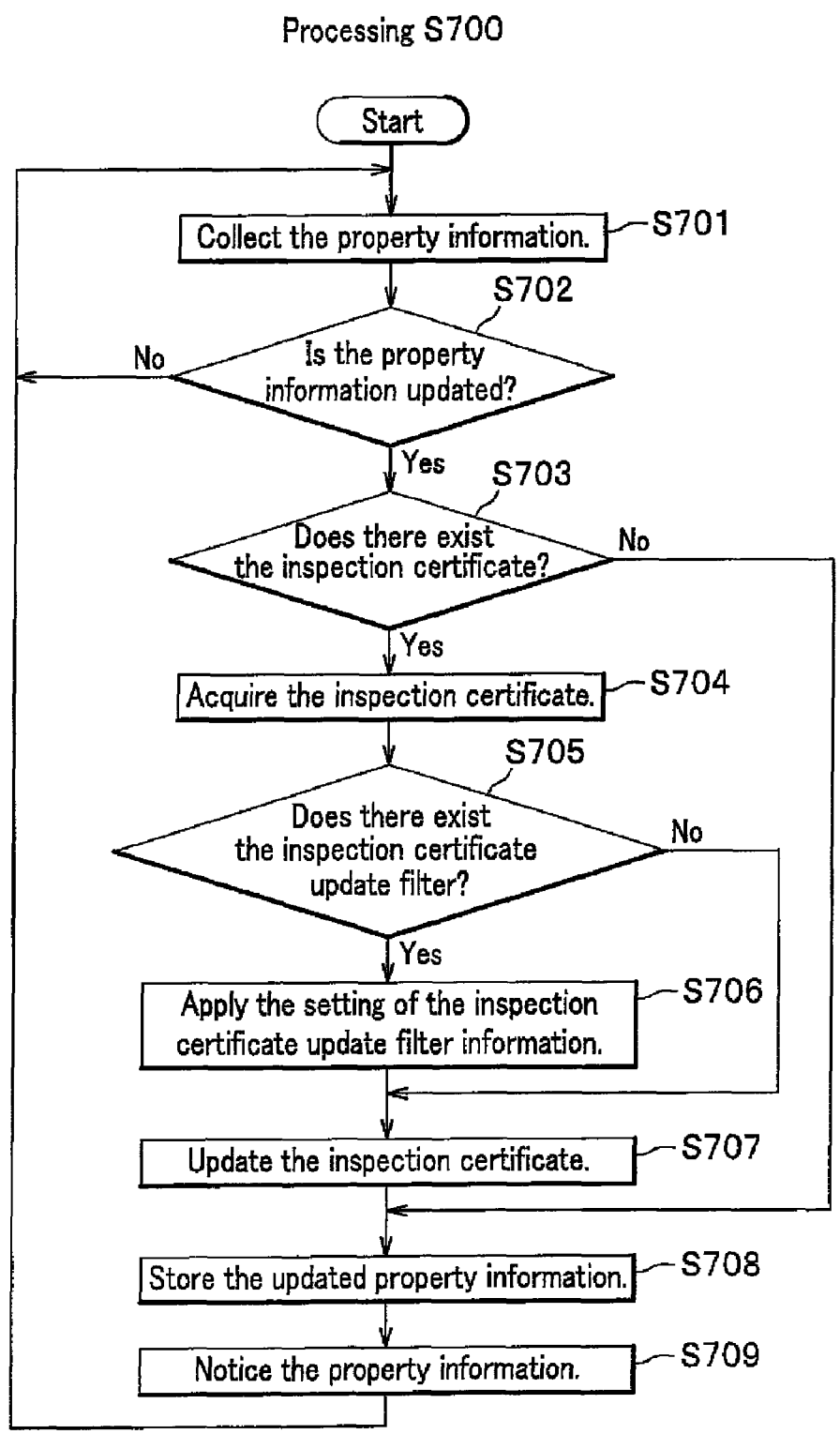
FIG. 7 is a flowchart showing one example of processings of an inspection certificate processing unit and a property information monitoring processing unit in the client computer.

Here will be described a flow of the processing S700 with respect to an update detection of the property information and inspection certificate update in the client computer 104, referring to FIG. 7.

If the program 331 is started on the client computer 104, the property information monitoring processing unit 333 collects the property information of the computer 104 (processing S701). Here, the property information includes information indicated in the property information table 261, the software table 262, the antivirus product table 263, the patch information table 264, and the system information table 265. The respective contents of the tables will be described in FIGS. 21 to 25.

As shown in FIG. 21, the property information table 261 is a table for storing information including a property ID (Identification) 2101 for identifying the client computer 104, a MAC address 2102, and an IP address 2103.

As shown in FIG. 22, the software table 262 is a table for storing information including a software ID 2201 for identifying the software, a software name 2202, a version 2203, and a property ID 2204.

As shown in FIG. 23, the antivirus product table 263 is a table for storing information including an antivirus product ID 2301 for identifying the antivirus product, a product name 2302, a version 2303, a pattern 2304, an inspection engine 2305, a resident state 2306, and a property ID 2307.

As shown in FIG. 24, the patch information table 264 is a table for storing information including a patch ID 2401 for identifying the patch, a patch name 2402, a version 2303, a pattern 2304, and a property ID 2403.

As shown in FIG. 25, the system information table 265 is a table for storing information including: a system information ID 2501 for identifying the system information; an information classification 2502 for indicating the information possessed by the system such as an OS, a memory capacity, and a registry; information 2503 for indicating a value possessed by the information classification 2502; and a property ID 2504.

Returning to FIG. 7, after the property information monitoring processing unit 333 collects the property information, the unit 333 compares the collected property information with the property information 341 previously stored, determines whether or not the collected property information is updated, and as a determination result, outputs the presence or absence of the update (processing S702).

When the property information is updated (Yes in the processing S702), the inspection certificate processing unit 332 determines whether or not there exists the inspection certificate information 342 that is the inspection certificate (processing S703). Here, the inspection certificate information 342 is information including information expressed by an inspection information 1300 as shown in FIG. 13. On the other hand, when the property information is not updated (No in the processing S702), the processing S700 returns to the processing S701.

As shown in FIG. 13, the inspection information 1300 includes a header, a check item, and a check filter condition and an update filter condition associated with the check item. The header includes an inspection certificate ID, an issue date and time, an expiration date and time, an inspection policy ID, a property ID, and the MAC address. In the check item is stored a value for indicating that the property information is not updated (without update) when the inspection certificate is issued; if the property information is updated, in the check item is stored a value for indicating that the associated item is updated (with update).

When there exists the connection request 410 for the network connection control computer 100, the inspection certificate is checked (see the processing S900 in FIG. 4), and the check filter condition is a filter condition whether or not to inspect the filter item. Specifically, when a check filter condition is "valid," the item of the check item is not inspected; that is, even if there exists the change of the "with update" state in the check item, it is meant that the change is ignored and the content of the check item is permitted. Furthermore, when the check filter condition is "invalid," if there exists a change of the "without update" state in the check item, it is meant that the content of the check item is surely checked.

The update filter condition is a filter condition for defining whether or not to change the update condition of the check item on the client computer 104 when any of mandatory software, prohibited software, an antivirus product, and patch information is installed. Here will be described a relationship between the update filter condition and check item of the inspection certificate information 1300 (see FIG. 13). In an item A of the update filter condition is enumerated the mandatory software; in an item B thereof is enumerated the prohibited software; in an item C thereof is enumerated the antivirus product and its version, pattern, and engine; and in an item D thereof is enumerated the patch information. The inspection certificate processing unit 332 does not set the associated check item as "with update" in any case that: the updated property information is the mandatory software; the antivirus product; a version-up, a version-up of the pattern, and a version-up of the engine; and the patch information, existing in the update filter condition. Furthermore, the inspection certificate processing unit 332 sets the associated check item as "with update" in a case that the updated property information is the prohibited software existing in the update filter condition.

Returning to FIG. 7, when there exists the inspection certificate information 342 that is the inspection certificate (Yes in the processing S703), the inspection certificate processing unit 332 acquires the information 342 (processing S704). When there exists no inspection certificate (No in the processing S703), the property information monitoring processing unit 333 stores the property information with update as the property information 341 (processing S708).

Figure 11:
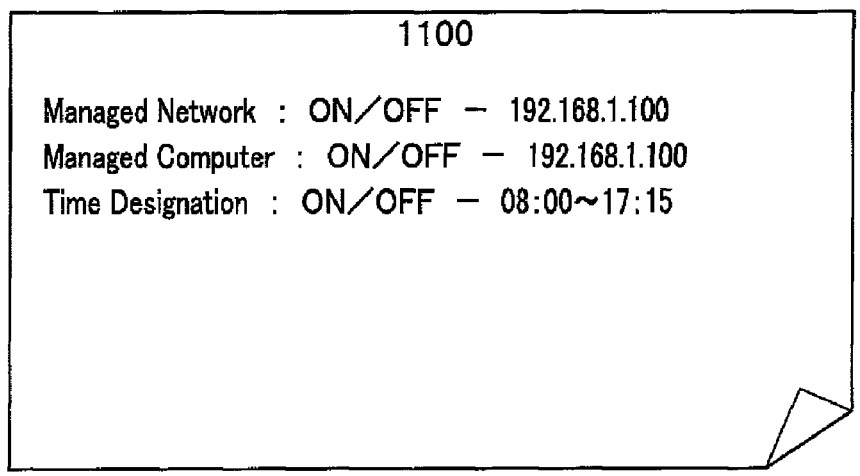
FIG. 11 is an illustration drawing showing inspection certificate update filter information.

After the inspection certificate processing unit 332 acquires the inspection certificate in the processing S704, as shown in FIG. 11, the processing unit 332 refers to an inspection certificate update filter information 1100, determines a presence or absence of ON/OFF, and outputs any one of ON and OFF (processing S705). Here, the inspection certificate update filter is information including information expressed by the inspection certificate update filter information 1100.

As shown in FIG. 11, the inspection certificate update filter information 1100 is information including information of: such a managed network for identifying a network where the client computer 104 belongs; a managed computer for identifying an installation of such software by means of a property information managed computer; and a time designation for identifying whether or not the installation is within a designated time. When the condition in the inspection certificate update filter information 1100 is satisfied, it is meant that the permission is given without check. For example, when the managed computer is ON (valid), the installation from a computer having an IP address code of 192.168.1.100 may be ignored.

When the managed computer is ON (valid), if the inspection certificate processing unit 332 searches the IP address of the property information managed computer 102 and does not find it, the processing unit 332 ignores the update filter condition of the inspection certificate information 1300, and sets the associated check item as "with update." Thus the update of the property information may be detected which is not connected to the network to be belonged thereto. When the managed computer is ON (valid), the managed computer ignores the update filter condition of the inspection certificate information 1300 with respect to an installation except for the property information managed computer, and sets an associated check item as "with update." Thus the update of the property information may be detected except for the managed computer. When the time designation is ON (valid), the managed computer ignores the update filter condition of the inspection certificate information 1300 with respect to the update of the property information except for the time designated by the inspection certificate processing unit 332, and sets an associated check item as "with update." Thus the update of the property information may be detected except for the designated time.

Returning to FIG. 7, when there exists the setting of the inspection certificate update filter information 343 (Yes in the processing S705), the inspection certificate processing unit 332 applies the setting of the inspection certificate update filter information 1100 (processing S706). After the setting of the inspection certificate update filter information 1100 is applied in the processing S706 or when there exists no setting of the filter information 1100 (No in the processing S705), the inspection certificate processing unit 332 refers to the update filter condition of the inspection certificate information 1300, sets the check item of the information 1300 associated with the property information updated by such an installation of software as "with update," and thereby updates the inspection certificate (processing S707).

According to the processings described above, the update of the inspection certificate may be dynamically changed, depending on the states of a connection network, an installation source, a time, and the like.

After the update of the inspection certificate, the property information monitoring processing unit 333 stores the updated property information as the property information 341 (processing S708). After the property information monitoring processing unit 333 stores the updated property information, notices the property information managed computer 102 of the updated property information as an update notice 500 (processing S709), and the processing S700 returns to the processing S701. In addition, the program 331 preferably executes such the processings periodically.

Here will be described a flow of the processing S800 of a security inspection and inspection certificate issue of the property information in the security inspection computer 101, referring to FIGS. 2, 5, and 21 to 25.

Figure 12:
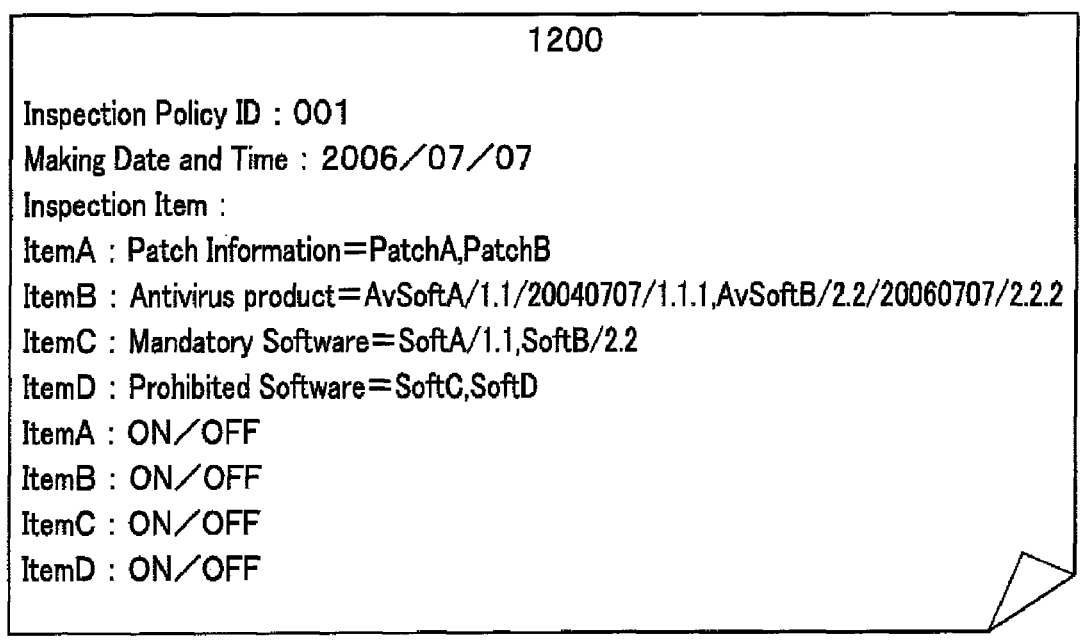
FIG. 12 is an illustration drawing showing inspection policy information.

The program 201 on the security inspection computer 101 is started by the inspection request 510 (see FIG. 5) from the property information managed computer 102. The security inspection processing unit 203 makes the update property information 511 including the property information ID transmitted by the inspection request 510 to be an input, and acquires information in the property information managed computer 102 corresponding to the information 511: the MAC address 2102 and IP address 2103 of the property information table 261 (see FIG. 21); the software name 2202 and version 2203 of the software table 262 (see FIG. 22); the product name 2302, version 2303, pattern name 2304, and detection engine 2305, and resident state 2306 of the antivirus product table 263 (see FIG. 23); the patch name 2402 of the patch information table 264 (see FIG. 24); the information classification 2502 and information 2503 of the system information table 265 (see FIG. 25) (processing S801). Then the security inspection processing unit 203 acquires the inspection policy 211 (processing S802), makes the acquired property information and the policy 211 an input, executes the security inspection (processing S803), and stores an inspection result of "pass" or "no pass" in the inspection history table 212 as an output (processing S804). Here, the inspection policy 211 is information including an inspection policy information 1200 as shown in FIG. 12.

In the inspection policy information 1200 may be defined an inspection policy ID, a making date and time, inspection items, ON/OFF (valid/invalid) of the inspection items, and the like. As the inspection items, the patch information, the antivirus product, the mandatory software, the prohibited software, and the like may be cited. Specifically, when the inspection item A is in the state of ON, the item A is to be inspected.

Figure 8:
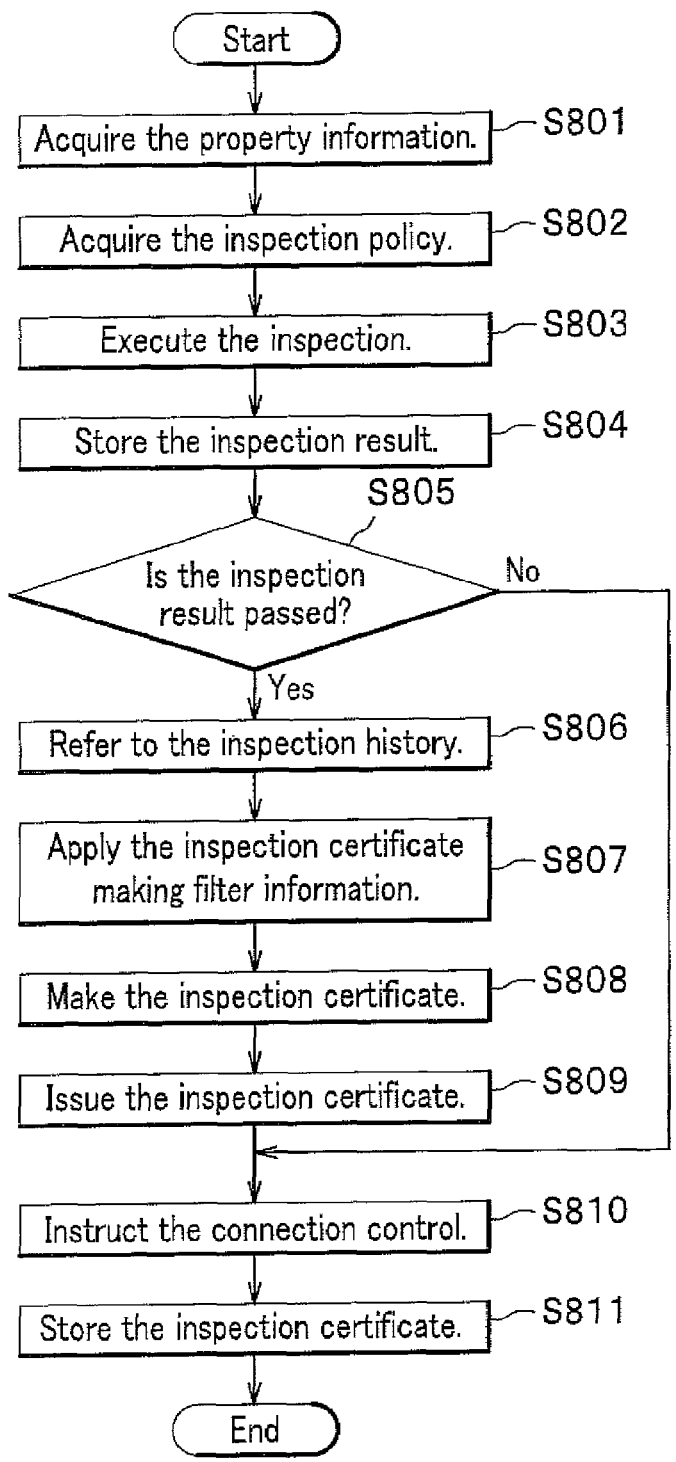
FIG. 8 is a flowchart showing one example of processings of an inspection certificate processing unit and a security inspection processing unit in the security inspection computer.

Returning to FIG. 8, the security inspection (processing S803) will be described in detail. The security inspection processing unit 203 compares the acquired property information with the information defined in each inspection item of the inspection policy 1200, which is an input; if the acquired property information conforms to the information defined in the inspection policy 1200, the unit 203 outputs the determination of "pass" in the security inspection; and if the acquired property information does not conform to the information defined in the inspection policy 1200, the unit 203 outputs the determination of "no pass" in the security inspection. With respect to the mandatory software of the inspection item, the security inspection processing unit 203 compares the mandatory software of the inspection policy information 1200 with the software name 2202 and version 2203 of the software table 262; if the software name matches and the version is after that of the inspection policy, the security inspection is passed; and if not, the security inspection is not passed. With respect to the prohibited software, if the prohibited software of the inspection policy information 1200 and the software name 2202 of the software table 262 match, the security inspection is not passed; and if not, the security inspection is passed. With respect to the antivirus product of the inspection item, the security inspection processing unit 203 compares the antivirus product of the of the inspection policy information 1200 with the product name 2302, version 2303, pattern name 2304, and detection engine 2305, and resident state 2306 of the antivirus product table 263; if the product name matches, the version is after that of the inspection policy, the pattern is after that of the inspection policy, and the inspection engine is after that of the inspection policy, the security inspection is passed; and if not, the security inspection is not passed. With respect to the patch information of the inspection item, the security inspection processing unit 203 compares the patch information of the inspection policy information 1200 with the patch name 2402 of the patch information table 264; if the patch name matches, the security inspection is passed; and if not, the security inspection is not passed. the security inspection processing unit 203 stores the inspection result in the inspection history table 212 as shown in FIG. 16 (processing S804).

Figure 16:
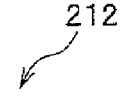
FIG. 16 is an illustration drawing showing an inspection history table.

As shown in FIG. 16, the inspection history table 212 is a table including information such as a property information ID 1601 for identifying the client computer 104, a history ID 1602, an inspection result 1603, an inspection date and time 1604, an inspection policy ID 1605; and the item A 1606, item B 1607, item C 1608, and item D 1609 of the inspection items. In the inspection history table 212 the security inspection processing unit 203 stores the inspected property information ID 1601 of the client computer 104 in the property information ID 1601; stores a numeral in the history ID 1602 that orders the inspection history with respect to the property information ID 1601, stores "pass" in the inspection result 1603 if every inspection result is "pass" in each of the inspection items, and stores "no pass" in the inspection result 1603 if every inspection result is "no pass"; then stores the date and time in the inspection date and time 1604 when the inspection is executed; and stores the inspection results of the item A 1606, the item B 1607, the item C 1608, and the item D 1609 in the respective inspection items.

Returning to FIG. 8, the inspection certificate processing unit 202 thereafter determines whether or not every inspection result is "pass" (processing S805). If the inspection result 1603 of the inspection history table 212 is "pass" (Yes in the processing S805), the inspection certificate processing unit 202 refers to the inspection history table 212 and the inspection policy information 1200 (processing S806). If the inspection result 1603 is "no pass" (No in the processing S805), the inspection certificate processing unit 202 executes the network connection control instruction of the rejection (processing S810). After the processing S806, the inspection certificate processing unit 202 refers to the inspection history table 212 and the inspection policy information 1200, and makes and applies the inspection certificate making filter (processing S807). Here, the inspection certificate making filter is information including the inspection certificate making filter information 1500, and sets the check filter condition and update filter condition of the inspection certificate information 1300 when the inspection certificate processing unit 202 makes the inspection certificate.

Figure 15:
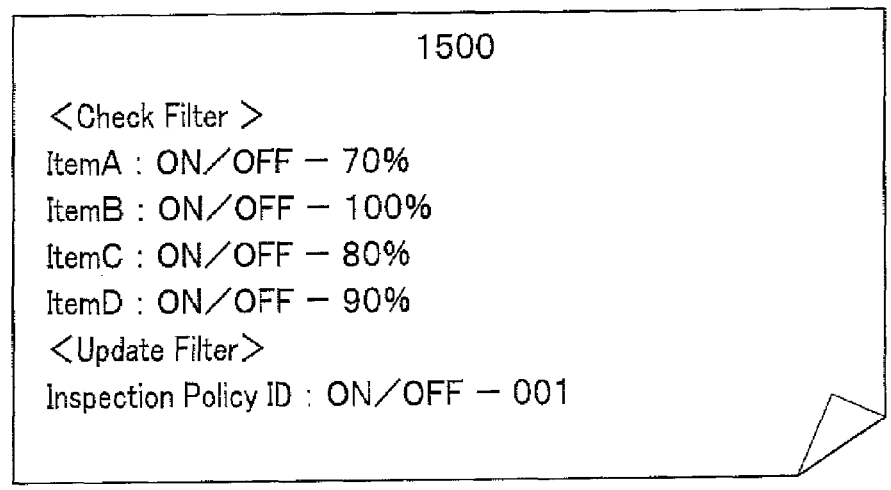
FIG. 15 is an illustration drawing showing inspection certificate making filter information.

As shown in FIG. 15, the inspection certificate making filter information 1500 may define: values of ON/OFF for validating or invalidating the check filters in the items A, B, C, and D as the check filters corresponding to the respective check items of the inspection certificate information 1300 and the respective inspection items of the inspection policy information 1200; and pass ratios in the respective inspection items. Here, the pass ratio is a ratio of the number of passed times to that of inspected times. In addition, the inspection certificate making filter information 1500 may define values of ON/OFF for validating or invalidating the inspection policy ID and the update filters as the update filters corresponding to the respective check items and the respective inspection items. The check filters and the update filters are dynamically made and applied when the inspection certificate is made.

Returning to FIG. 8, the inspection certificate processing unit 202 makes the inspection certificate making filter as an input and makes the inspection certificate (processing S808), issues the inspection certificate for the network connection control computer 100 and the property information managed computer 102 (processing S809), and gives the connection control instruction to the computer 100 (processing S810).

Next will be described the making of the inspection certificate. When the inspection certificate processing unit 202 makes the inspection certificate, the processing unit 202 sets the inspection certificate ID, the issue date and time, the expiration date and time, an applied inspection policy ID, a property ID for identifying an inspected client computer 104, and the MAC address. Furthermore, the inspection certificate processing unit 202 refers to the inspection certificate making filter, and sets the check filter condition and update filter condition of the inspection certificate information 1300. When the check filter condition of the inspection certificate making filter information 1500 (see FIG. 15) is ON in the inspection certificate processing unit 202 setting the check filter condition, the processing unit 202 acquires the item A 1606, the item B 1607, the item C 1608, and the item D 1609 where the inspection results are stored corresponding to the respective inspection items of the inspection policy information 1200 of the inspection history table 212 with respect to the property ID associated with the inspected client computer 104; and calculates the pass ratios of the item A 1606, the item B 1607, the item C 1608, and the item D 1609. The inspection certificate processing unit 202 compares the pass ratios calculated for the respective items with those of the check filters of the inspection certificate making filter; if the calculated pass ratios are not less than the pass ratios of the check filters, the processing unit 202 may set the check filter condition of the inspection certificate information 1300 to be an update rejection. Furthermore, when the inspection certificate processing unit 202 sets the update filter condition, if the update filter of the inspection certificate making filter information 1500 is ON, the processing unit 202 may set each inspection item of the inspection policy 1200 having the inspected inspection policy ID to each item of the update filter condition of the inspection certificate information 1300, wherein the each item corresponds to the each inspection item. Thus when the inspection certificate processing unit 202 makes the inspection certificate, the processing unit 202 may dynamically reflect the inspection history and inspection policy of the client computer 104 in inspection.

Figure 14:
FIG. 14 is an illustration drawing showing an inspection certificate table.

In the inspection certificate issue and the connection control instruction, when the inspection result 1603 of the inspection history table 212 is "pass", the inspection certificate processing unit 202 of the security inspection computer 101 sends the inspection certificate information 1300 to the network connection control computer 100 and gives the connection control instruction of the permission. When the inspection result 1603 is "no pass", the inspection certificate processing unit 202 does not send the inspection certificate information 1300 to the network connection control computer 100, sends inspection certificate expiration information including the property ID to the computer 100, and gives the connection control instruction of the rejection. If the network connection control computer 100 receives the inspection certificate information 1300, as shown in FIG. 14, the inspection certificate processing unit 222 stores: the inspection certificate ID of the information 1300 in an inspection certificate ID 1401 of the inspection certificate table 231; the inspection certificate ID of the information 1300 in an inspection certificate ID 1402 of the table 231; and the MAC address of the information 1300 in a MAC address 1403 of the table 231. In addition, when inspection certificate information for a same property ID is stored, the information is overwritten; when the inspection certificate expiration information is sent, the record information of the inspection certificate table 231 corresponding to the property ID is deleted. Furthermore, when the connection control instruction is permitted, the connection control processing unit 223 stores "permission" in a connection control 1903 (see FIG. 19) of the connection control table 233 corresponding to the MAC address of the inspection certificate information 1300; when the connection control instruction is rejected, the connection control processing unit 223 stores "rejection" in the connection control 1903. Furthermore, if the property information managed computer 102 receives the inspection certificate issued by the inspection certificate processing unit 252, the computer 102 transmits the received inspection certificate to the client computer 104 as it is. The inspection certificate processing unit 332 of the client computer 104 stores the received inspection certificate as the inspection certificate information 342.

Then when the security inspection computer 101 issues the inspection certificate, the computer 101 stores the inspection certificate ID and the like in the inspection certificate table 213 as shown in FIG. 14 (processing S811). The security inspection computer 101 stores: the inspection certificate ID of the information 1300 in the inspection certificate ID 1401 of the inspection certificate table 213; the inspection certificate ID of the information 1300 in the inspection certificate ID 1402 of the table 213; and the MAC address of the information 1300 in the MAC address 1403 of the table 213.

As shown in FIG. 14, the inspection certificate table 213 is a table including the information of the inspection certificate ID 1401, the inspection certificate ID 1402, and the MAC address 1403. The inspection certificate processing unit 332 stores: the inspection certificate ID of the inspection certificate information 1300 in the inspection certificate ID 1401; the inspection certificate ID of the information 1300 in the inspection certificate ID 1402; and the MAC address of the information 1300 in the address 1403.

Thus the security inspection computer 101 executes the processings of the security inspection and inspection certificate issue of the property information.

Here will be described a flow of the processing S900 of the connection control in the network connection control computer 100.

The program 221 on the security inspection computer 101 is started upon receipt of the inspection request 410 from the network connection control apparatus 103. If the connection control processing unit 223 receives the inspection request 410 (processing S901), the processing unit 223 executes a user authentication (processing S902). In the user authentication the user information 411 including a received user ID and password is made an input, thereby the user authentication table 234 (see FIG. 20) is searched, a user ID 2001 and a password 2002 are compared whether or not they match, and a success or a failure is obtained as an output.

As shown in FIG. 20, the user authentication table 234 is a table including information of the user ID 2001 and the password 2002.

Figure 9:
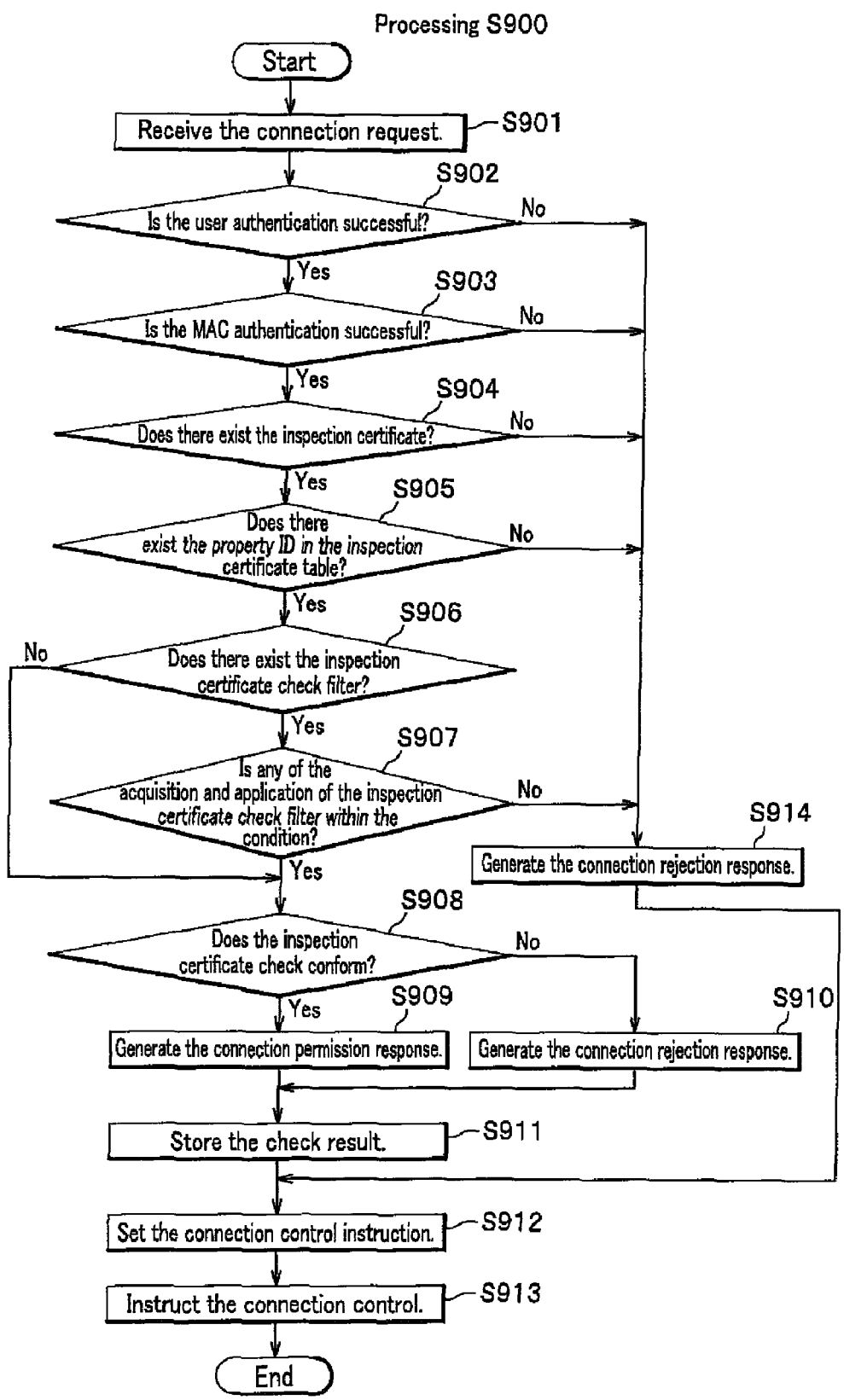
FIG. 9 is a flowchart showing one example of processings of an inspection certificate processing unit and a connection control processing unit in the network connection control computer.

Returning to FIG. 9, when the user authentication is successful (Yes in the processing S902), next the connection control processing unit 223 executes a MAC authentication (processing S903). When the user authentication is failed (No in the processing S902), the connection control processing unit 223 generates a connection rejection response (processing S914), and the processing S900 proceeds to a processing S912. In the MAC authentication the received MAC address is made an input, thereby the connection control table 233 is searched as shown in FIG. 19, and the MAC address is checked whether or not to exist in the MAC address 1901 of the connection control table 233; if the MAC address exists in the address 1901, the success is output as a result of the MAC authentication; and if not, the failure is output as a result thereof.

As shown in FIG. 19, the connection control table 233 is a table including information of the MAC address 1901, the property ID 1902, the connection control 1903, an in-permission connection destination 1904, and an in-rejection connection destination 1905.

Returning to FIG. 9, when the MAC authentication is successful (Yes in the processing S903), the connection control processing unit 223 determines whether or not the inspection certificate exists in the information 411 transmitted by the connection request 410 (processing S904). When the MAC authentication is failed (No in the processing S903), the connection control processing unit 223 generates a connection rejection response (processing S914), and the processing S900 proceeds to the processing S912.

The inspection certificate processing unit 222 determines whether or not the inspection certificate exists in the connection request 410 (processing S904). When the inspection certificate exists in the connection request 410 (Yes in the processing S904), the inspection certificate processing unit 222 searches the inspection certificate ID 1401 corresponding to the property ID of the client computer 104 from the property ID 1402 of the inspection certificate table 213, and determines whether or not there exists a relevant property ID (processing S905). When there exists the relevant property ID (Yes in the processing S905), the inspection certificate processing unit 222 acquires the inspection certificate information 1300 and the processing S900 proceeds to a processing S906. When there exists no inspection certificate (No in the processing S904), the inspection certificate processing unit 222 makes the connection rejection response (processing S914), and the processing S900 proceeds to the processing S912 Furthermore, when there exists no relevant property ID (No in the processing S905), the inspection certificate processing unit 222 makes the connection rejection response (processing S914), and the processing S900 proceeds to the processing S912. When there exists the check filter (Yes in the processing S906), the inspection certificate processing unit 222 acquires the inspection certificate check filter information 235 and applies it to the connection request 410. When there exists no check filter (No in the processing S906), the processing S900 proceeds to a processing S908.

As shown in FIG. 17, the inspection certificate check filter 235 is information including an inspection certificate check filter information 1700. In the filter information 1700 may be defined a connection time and a connection interval. Furthermore, in the filter information 1700 may be defined ON/OFF (valid/invalid) of the connection time and the connection interval. Specifically, when the connection time is ON (valid) from 10:00 to 17:00, if the client computer 104 requests the connection request 410 in the designated time (10:00 to 17:00), the processing S900 proceeds to the next processing.

Returning to FIG. 9, when the connection request 410 is made at a time except for the designated time relating to the connection time (No in the processing S907), the connection control processing unit 223 makes the connection rejection response (processing S914). With respect to the connection interval, as shown in FIG. 18, the connection control processing unit 223 refers to the connection history table 232, searches a MAC address 1802 of the table 232 for the MAC address of the connection request 410, and calculates an hour previously connected; When the hour exceeds the connection interval of the inspection certificate check filter information 1700 (No in the processing S907), the connection control processing unit 223 makes the connection rejection response (processing S914), and the processing S900 proceeds to the processing S902.

As shown in FIG. 18, the connection history table 232 is a table including a connection history ID 1801 for identifying the connection, a MAC address 1802, a connection date and time 1803, and a connection time 1804; and a connection destination 1805 for indicating a connected network. As the connected network, the quarantine network 10*q* and the service network 10*s* are cited.

Returning to FIG. 9, according to the processing S907, the inspection certificate filter information may be dynamically changed depending on any state of the hour and the connection interval when the client computer 104 is connected.

Then when a predetermined condition is satisfied (Yes in the processing S907), the inspection certificate processing unit 222 checks the inspection certificate (processing S908). In the inspection certificate check processing the inspection certificate processing unit 222 compares and determines whether or not the inspection certificate acquired from the inspection certificate ID corresponding to each client computer 104 and stored in the inspection certificate table 213 on the network connection control computer 100 matches the inspection certificate 411 received in response to the connection request 410 in the inspection certificate ID, the issue date and time, the expiration date and time, the inspection policy ID, and the check items indicated in the inspection certificate information 1300. That is, the inspection certificate processing unit 222 determines whether or not the inspection certificate check matches. When the inspection certificate check conforms (all of the check matches) (Yes in the processing S908), the inspection certificate processing unit 222 makes the connection permission response (processing S909). When the inspection certificate check does not conform (does not match) (No in the processing S908), the inspection certificate processing unit 222 makes the connection rejection response (processing S910). However, when the inspection certificate processing unit 222 compares the check items of the inspection certificate information 1300, the processing unit 222 refers to the check filter condition corresponding to each check item of the inspection certificate on the network connection control computer 100; When the check filter condition is valid, the comparison result of the check item may be ignored.

After the inspection certificate processing unit 222 makes any one of the connection permission response and the connection rejection response (processings S909, S910), the processing unit 222 stores the check result (processing S911); the connection control processing unit 223 sets the connection control instruction of any one of the connection permission and the connection rejection (processing S912), and gives the connection control instruction to the network connection control apparatus 103 (processing S913). In the step of giving connection control instruction the connection control processing unit 223 obeys any one of the connection permission and the connection rejection, and gives the connection control instruction for the network connection control apparatus 103 to connect the client computer 104 to the in-permission connection destination 1904 or in-rejection connection destination 1905 of the connection control table 233. Here, according to respective processings of checking the user authentication, the MAC authentication, and the inspection certificate, the inspection certificate processing unit 222 may reject the connection to the service network 10*s* in making the connection rejection response or instruct the in-rejection connection destination 1905. Thus the network connection control computer 100 gives the network connection control instruction to the network connection control apparatus 103.

Figure 10:
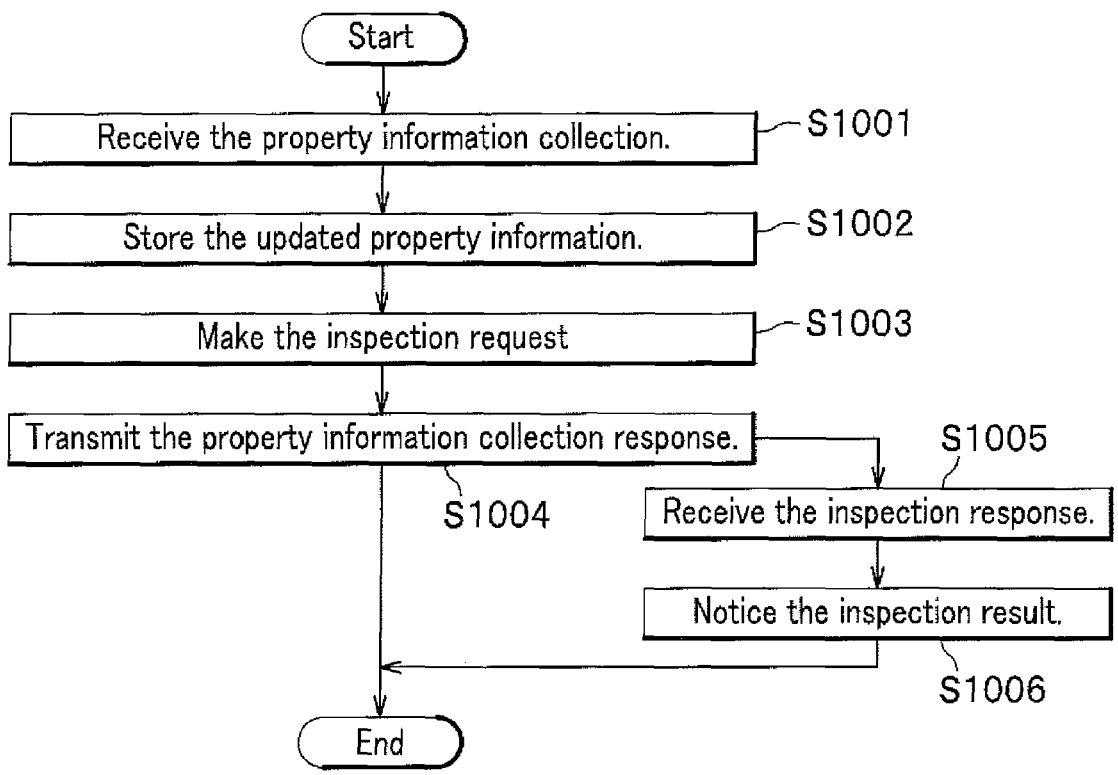
FIG. 10 is a flowchart showing one example of processings of an inspection certificate processing unit and a property information collection processing unit in the property information managed computer.

Here will be described a processing flow of a property information collection in the property information managed computer 102 with reference to FIG. 10.

The program 251 on the property information managed computer 102 is started upon receipt of the update notice 500 from the client computer 104. If the property information collection processing unit 253 receives the update notice 500 (processing S1001), the property information collection processing unit 253 stores the updated property information in the property ID 2101, MAC address 2102, and IP address 2103 of the property information table 261 (see FIG. 21); stores the software information of the updated property information in the software name 2202, version 2203, and property ID 2204 of the software table 262 (see FIG. 22); stores the antivirus product information of the updated property information in the product name 2302, version 2303, pattern 2304, inspection engine 2305, resident state 2306, and property ID 2307 of the antivirus product table 263 (see FIG. 23); and stores the patch information of the updated property information in the patch name 2402 and property ID 2403 of the patch information table 264 (see FIG. 24); and stores the system information of the updated property information in the information classification 2502, information 2503, and property ID 2504 of the system information table 265 (see FIG. 25) (processing S1002).

The property information collection processing unit 253 makes the inspection request 510 to the security inspection computer 101 (processing S1003). Then the property information collection processing unit 253 transmits the property information collection response to the client computer 104 (processing S1004).

Furthermore, if the inspection certificate processing unit 252 receives the inspection response from the security inspection computer 101 (processing S1005), the processing unit 252 gives the update result notice to the client computer 104 (processing S1006). With respect to the update result notice, if there exists the inspection certificate in the inspection response, the inspection certificate processing unit 252 transmits the inspection certificate. The inspection certificate processing unit 332 of the client computer 104 stores the received inspection certificate as the inspection certificate information 342. Thus the property information managed computer 102 collects the property information of the client computer 104.

According to the embodiment, the quarantine system QS comprises: a network connection control apparatus (for example, the network connection control apparatus 103) configured to connect a client (for example, the client computer 104) to the network 10 including the first network (service network 10*s*) and the second network (quarantine network 10*q*); a management server (for example, the security inspection computer 101 and the property information managed computer 102) configured to manage the property information of the client connected to the network 10, and to issue an inspection certificate to the client when the property information satisfies a predetermined condition; and an inspection certificate check server (for example, the network connection control computer 100), when the client makes a connection request for the network 10*q* configured to check an inspection certificate sent by the client and an inspection certificate issued by the management server, to instruct the network connection control apparatus 103 to connect the client to the service network 10*s* when the check result matches, to instruct the network connection control apparatus 103 to connect the client to the quarantine network 10*q* for quarantining the property information of the client when the check result does not match. Thereby the quarantine system QS may inspect the status of the security measure in the client and control the connection to any one of the first and second networks.

Firstly, if the client computer 104 makes the connection request 410 to the network, there exists no inspection certificate on the computer 104 when the connection request 410 is made; therefore, the network connection control apparatus 103 connects the computer 104 to the quarantine network 10$q$ according to the instruction of the network connection control computer 100. After the client computer 104 is connected to the quarantine network 10$q$, the property information managed computer 102 collects the property information of the computer 4, and the security inspection computer 101 inspects the property information. When the inspection is passed, the security inspection computer 101 issues the inspection certificate to the network connection control computer 100 and the property information managed computer 102. When the property information managed computer 102 receives the inspection certificate, the computer 102 transmits the certificate to the client computer 104.

The client computer 104 again executes the network connection, checks the inspection certificate received by the network connection control computer 100 and an inspection certificate already issued by the security inspection computer 101, and controls the network connection according to the check result.

At this time, when the inspection certificate received from the property information managed computer 102 is updated on the client computer 104 in conjunction with the update of the property information, the inspection certificate check by means of the network connection control computer 100 does not match; therefore, the computer 100 instructs the network connection control apparatus 103 to execute the connection control for connecting the computer 104 to the quarantine network 10$q$, and the apparatus 103 connects the computer 4 to the quarantine network 10$q$.

When the property information of the client computer 104 is not updated, the inspection certificate check by means of the network connection control computer 100 matches; therefore, the computer 100 instructs the network connection control apparatus 103 to execute the connection control to the service network 10$s$, and the apparatus 103 connects the computer 4 to the service network 10$s$. Thus by the security inspection of the property information and the inspection certificate check in the network connection, the network connection control computer 100 executes the network connection control to any one of the quarantine network 10$q$, the service network 10$s$, and the like.

According to the embodiment, the network connection of the client computer 104 may be speedily achieved without collecting the property information of the computer 4 every time by checking the inspection certificate in executing the network connection of the computer 104 and executing the network connection control.

Furthermore, because the inspection certificate check is executed on a computer (for example, the network connection control computer 100) determining the network connection control, load on a computer (for example, the security inspection computer 101) for inspection may be reduced. Thus the security in the quarantine system QS may be adequately kept and be easily applied to a large scale client computer environment.

What is claimed is:

1. A quarantine system for quarantining property information of a client in connecting the client to a network, the system comprising:
   a network connection apparatus configured to connect the client to the network including a service network and a quarantine network;
   a management server configured to store the property information of the client connected to the network, to issue a property inspection certificate to the client when the property information of the client satisfies a predetermined condition, and to send the property inspection certificate to an inspection certificate check server; and
   the inspection certificate check server configured to:
   (A) receive the property inspection certificate from the management server;
   (B) receive a connection request certificate from the client;
   (C) compare the connection request certificate with the property inspection certificate received from the management server;
   (D1) instruct the network connection apparatus to connect the client to the service network if the connection request certificate matches to the property inspection certificate;
   (D2) instruct the network connection apparatus to connect the client to the quarantine network configured to quarantine the property information of the client if the connection request certificate does not match to the property inspection certificate;
   wherein when the client executes the connection request to the network for a first time and the inspection certificate check server does not receive the property inspection certificate from the client, the inspection certificate check server instructs the network connection apparatus to connect the client to the quarantine network; and
   wherein when the client is connected to any one of the service network and the quarantine network, the client sends the property information to the management server, and wherein when the property information satisfies a predetermined condition, the management server issues the property inspection certificate to the client and the inspection certificate check server.

2. The quarantine system according to claim 1, wherein when the client is connected to the quarantine network and accepts the property inspection certificate, the client again executes the connection request and sends the accepted property inspection certificate to the inspection certificate check server.

3. The quarantine system according to claim 1, wherein the client inspects whether or not the property information is updated, and updates the contents of the property inspection certificate as an updated property inspection certificate when the property information is updated.

4. The quarantine system according to claim 1, wherein when the property information is updated, the client sends the updated property information to the management server, wherein when the updated property information satisfies a predetermined condition, the management server issues the property inspection certificate to the client and the inspection certificate check server, and wherein when the updated property information does not satisfy the predetermined condition, the management server instructs the inspection certificate check server to connect the client to the quarantine network.

5. The quarantine system according to claim 1, wherein the contents of both the inspection certificates include at least one of: patch information of an operating system; product information of an antivirus product; information of mandatory software which the client is requested to install; and information of prohibited software which the client is not requested to install.

6. A quarantine method of a quarantine system for quarantining property information of a client in connecting the client to a network having a service network and a quarantine network, the system including a management server, an inspection certificate check server, and a network connection apparatus, the method comprising operations of:
   the management server managing the property information of the client connected to the network, and to issue a property inspection certificate to the client when the property information satisfies a predetermined condition;

the inspection certificate check server, when the client makes a connection request to the network, configured to compare a second property inspection certificate received from the client with the first property inspection certificate received from the management server, instructing the network connection apparatus to connect the client to the service network if both the first and second property inspection certificates have the same content, and instructing the network connection apparatus to connect the client to the quarantine network configured to quarantine the property information of the client if both the first and second property inspection certificates do not have the same contents; and the network connection apparatus connecting the client to the instructed network according to the instruction of the inspection certificate check server;

wherein when the client executes the connection request to the network for a first time and the inspection certificate check server does not receive the second property inspection certificate from the client, the inspection certificate check server instructs the network connection apparatus to connect the client to the quarantine network; and wherein when the client is connected to any one of the service network and the quarantine network, the client sends the property information to the management server, and wherein when the property information satisfies a predetermined condition, the management server issues the second property inspection certificate to the client and the inspection certificate check server.

7. The quarantine method according to claim 6, wherein when the client is connected to the quarantine network and accepts the first property inspection certificate, the client again executes the connection request and sends the accepted property inspection certificate to the inspection certificate check server.

8. The quarantine method according to claim 6, wherein the client inspects whether or not the property information is updated, and updates the contents of the first property inspection certificate as an updated property inspection certificate when the property information is updated.

9. The quarantine method according to claim 6, wherein when the property information is updated, the client sends the updated property information to the management server, wherein when the updated property information satisfies a predetermined condition, the management server issues the first property inspection certificate to the client and the inspection certificate check server, and wherein when the updated property information does not satisfy the predetermined condition, the management server instructs the inspection certificate check server to connect the client to the quarantine network.

10. The quarantine method according to claim 6, wherein the contents of both the first and second property inspection certificates include any of: patch information of an operating system; product information of an antivirus product; information of mandatory software which the client is requested to install; and information of prohibited software which the client is not requested to install.

11. A non-transitory computer-readable medium embodying a quarantine program of a quarantine system, for quarantining property information of a client in connecting the client to a network having a service network and a quarantine network, the system including a network connection apparatus configured to connect the client to the network, and a management server configured to manage the property information of the client connected to the network and to issue a property inspection certificate to the client when the property information satisfies a predetermined condition, the program making the computer execute operations of:

comparing a property inspection certificate received from the client with the property inspection certificate received from the management server when the client makes a connection request to the network; and instructing the network connection apparatus to connect the client to the service network if both property inspection certificates have the same contents, and instructing the network connection apparatus to connect the client to the quarantine network configured to quarantine the property information of the client if both property inspection certificates do not have the same contents;

wherein when the client executes the connection request to the network for a first time without providing the property inspection certificate, the instructing operation instructs the network connection apparatus to connect the client to the quarantine network; and wherein when the client is connected to any one of the service network and the quarantine network, the client sends the property information to the management server, and wherein when the property information satisfies a predetermined condition, the management server issues the property inspection certificate to the client and for the comparing operation.

12. The non-transitory computer-readable medium according to claim 11, wherein when the client is connected to the quarantine network and accepts the property inspection certificate, the client again executes the connection request and sends the accepted property inspection certificate.

13. The non-transitory computer-readable medium according to claim 11, wherein the client inspects whether or not the property information is updated, and updates the contents of the property inspection certificate as an updated property inspection certificate when the property information is updated.

14. The non-transitory computer-readable medium according to claim 11, wherein when the property information is updated, the client sends the updated property information to the management server, wherein when the updated property information satisfies a predetermined condition, the management server issues the property inspection certificate to the client and the comparing operation, and wherein when the updated property information does not satisfy the predetermined condition, the management server instructs the instructing operation to connect the client to the quarantine network.

15. The non-transitory computer-readable medium according to claim 11, wherein the contents of both the property inspection certificates include at least one of: patch information of an operating system; product information of an antivirus product; information of mandatory software which the client is requested to install; and information of prohibited software which the client is not requested to install.

* * * * *